No. 12,572. REISSUED DEC. 11, 1906.

H. G. CARNELL.

GAS ENGINE.

APPLICATION FILED JUNE 1, 1903.

3 SHEETS—SHEET 1.

Witnesses
A. S. Kyle
E. G. Reamer

Inventor
Harry G. Carnell
by Alfred M. Allen
Attorney

THE NORRIS PETERS CO., WASHINGTON, D. C.

No. 12,572. REISSUED DEC. 11, 1906.

H. G. CARNELL.

GAS ENGINE.

APPLICATION FILED JUNE 1, 1903.

3 SHEETS—SHEET 2.

Witnesses
W. S. Kyle
C. G. Reamer

Inventor
Harry G. Carnell
by Alfred M. Allen
Attorney

THE NORRIS PETERS CO., WASHINGTON, D. C.

No. 12,572. REISSUED DEC. 11, 1906.

H. G. CARNELL.

GAS ENGINE.

APPLICATION FILED JUNE 1, 1903.

3 SHEETS—SHEET 3.

Witnesses
A. S. Kyle
E. G. Leamer.

Inventor
Harry G. Carnell
by Alfred M. Allen
Attorney

THE NORRIS PETERS CO., WASHINGTON, D.

UNITED STATES PATENT OFFICE.

HARRY G. CARNELL, OF DAYTON, OHIO.

GAS-ENGINE.

No. 12,572. Specification of Reissued Letters Patent. Reissued Dec. 11, 1906.

Original No. 613,757, dated November 8, 1898. Application for reissue filed June 1, 1903. Serial No. 159,720.

*To all whom it may concern:*

Be it known that I, HARRY G. CARNELL, a citizen of the United States, residing at Dayton, in the county of Montgomery and State of Ohio, have invented certain new and useful Improvements in Gas-Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in gas-engines, and in so far as the positions of the respective valves are concerned there is similarity between the present engine and the one shown and described in Letters Patent No. 556,086, granted to me March 10, 1896.

The object of the present invention is to obtain more regularity and uniformity in the speed of the engine by means hereinafter specified for controlling the opening of the admission-valves.

A further object of the invention is to provide an improved gasolene or oil attachment consisting of a timing and measuring valve that is operated under control of the governor simultaneously with the air and mixture admission valve, which valve admits air alone when said gasolene-feeding devices are used, and further objects of said invention, relate to means for operating the exhaust-valve.

To the foregoing ends the improvements have reference to parts, their construction, and arrangement, as will hereinafter be fully described in the specification and pointed out in the claims.

Figure 1:
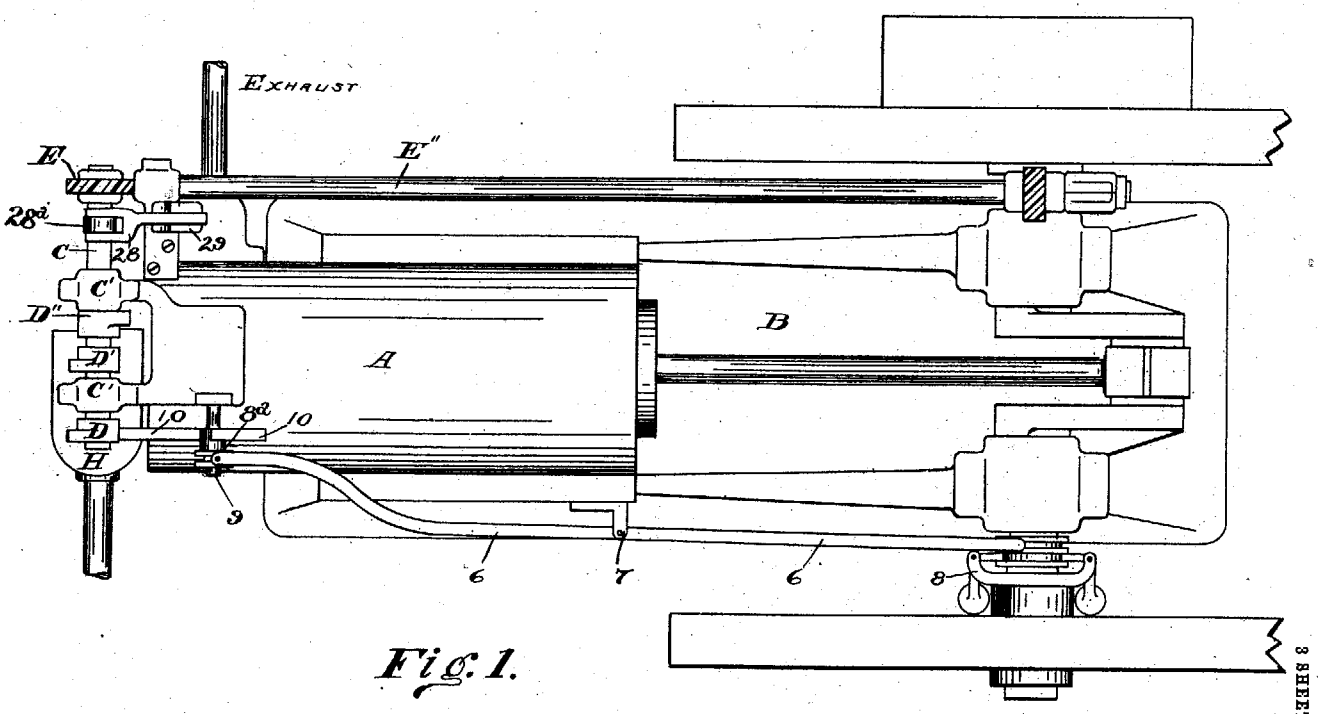
Figure 2:
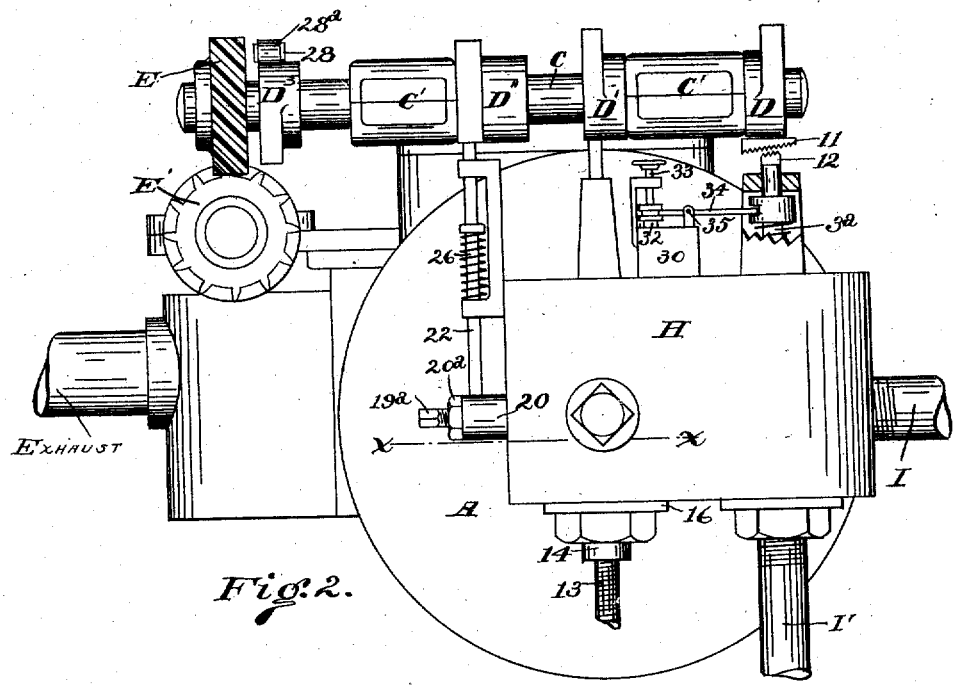
Figure 3:
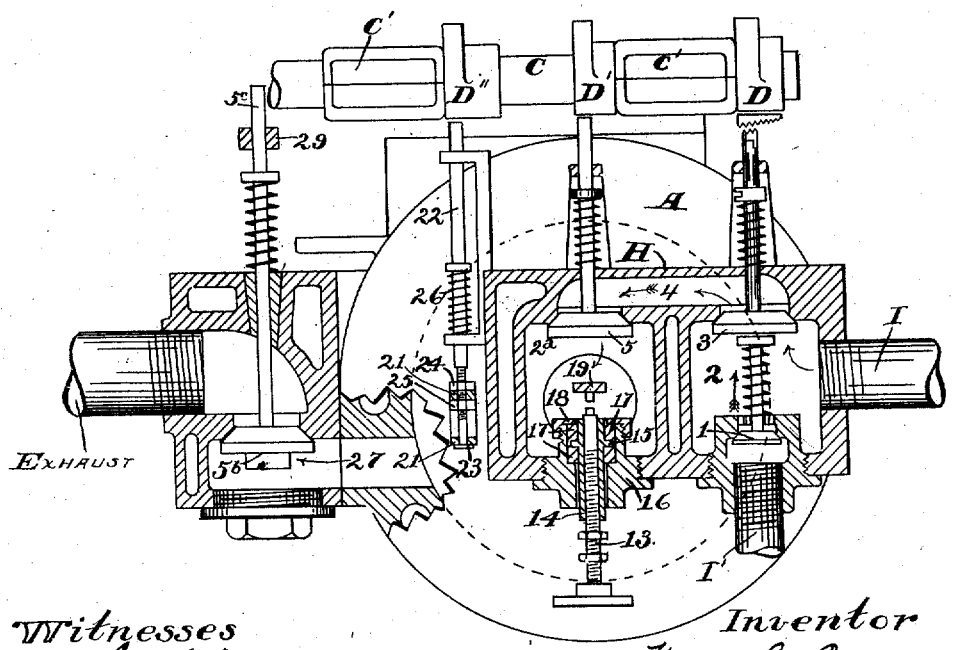
Figure 4:
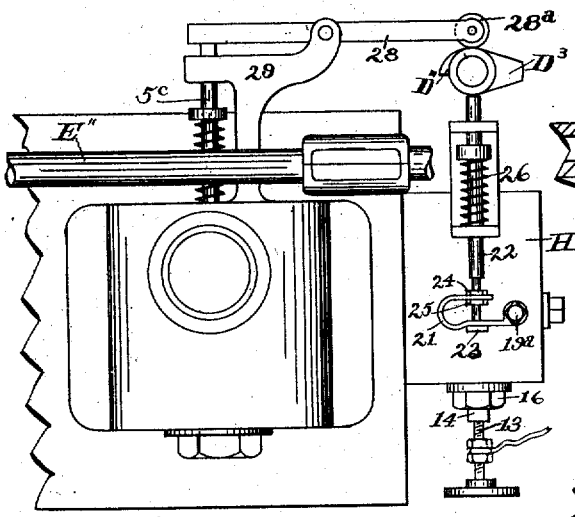
Figure 5:
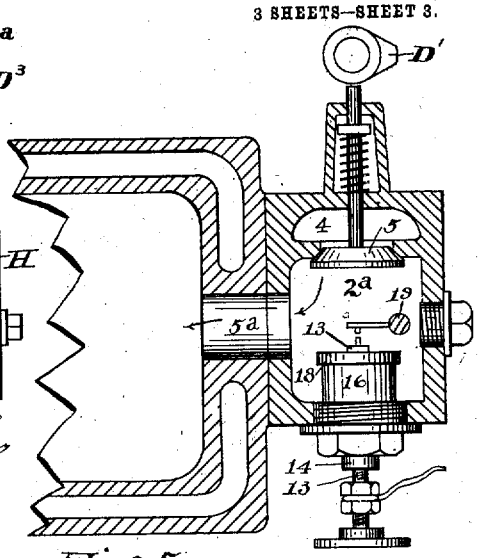
Figure 6:
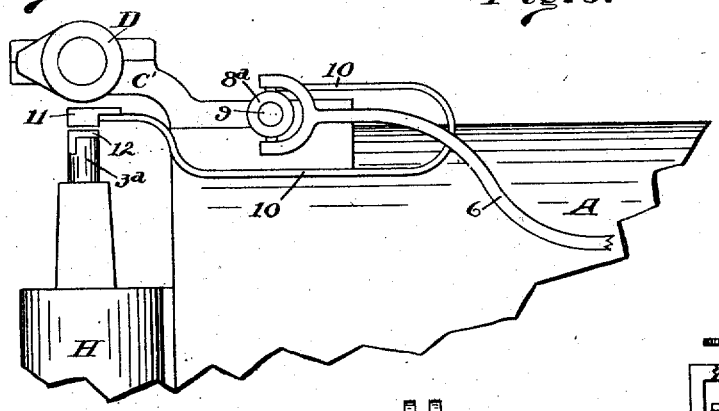
Figure 8:
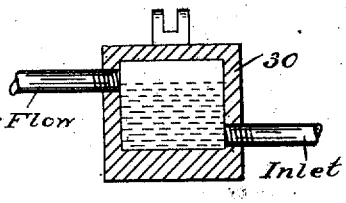
Figure 7:
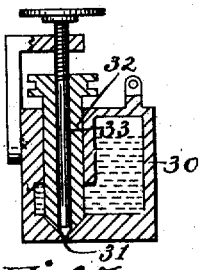
Figure 11:
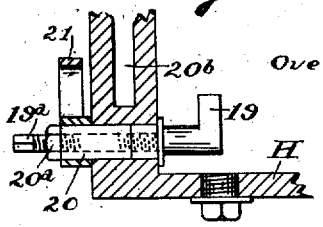
Figure 9:
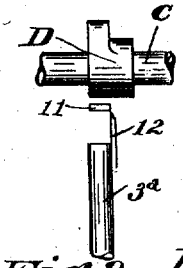
Figure 10:
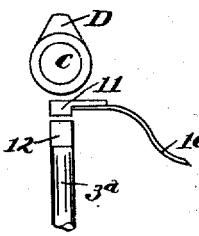

Figure 1 is a top or plan view of a gas-engine constructed in accordance with my invention. Fig. 2 is a front end view of the power-cylinder, showing the valve-box and adjacent mechanism. Fig. 3 is a vertical section through the valve-box. Fig. 4 is a partial side elevation of a portion of the power-cylinder, showing the exhaust. Fig. 5 is a longitudinal section through a part of the power-cylinder and combustion-chamber. Fig. 6 is a partial side elevation showing the devices for controlling the admission-valves. Figs. 7 and 8 are detail sectional views of the gasolene or oil attachment. Figs. 9 and 10 are detailed views of a modified form of tappet devices for controlling the admission-valves. Fig. 11 is a detailed sectional view of the movable electrode on the line $x$ $x$ of Fig. 2.

In the specification similar letters and figures of reference indicate corresponding parts in the several views.

A designates a power-cylinder which is suitably mounted in a bed B. The bore of said cylinder is shown in broken lines in Fig. 3.

C is a transverse cam-shaft mounted in bearings C′ C′ above the front end of said cylinder. This shaft carries a series of cams D D′, D″, and $D^3$, whose functions are to operate the valves and igniting devices, as will hereinafter more fully appear. E is a spiral gear on an end of said shaft C, that meshes with a similar gear E′ on a shaft E″, that is driven in a well-known manner from a crank-shaft F.

H designates a box rigidly secured to the front end of the cylinder and having chambers 2 and $2^a$, in which the air and gas are mixed and in which the mixture is subsequently ignited. The air and gas are admitted through pipes I and I′, respectively.

1 designates a valve for the admission of gas to the mixing-chamber 2, and 3 is an outwardly-opening valve for the admission of the mixture from said chamber 2 to a passage or chamber 4. This valve 3 is seated above the valve 1, and when it is opened sufficiently it impacts against the stem of said valve 1, and the two valves 1 and 3 are thus simultaneously opened, substantially as is shown and described in the patent hereinbefore referred to.

From the passage 4 the mixture is admitted to the combustion-chamber $2^a$ through an inwardly-opening check-valve 5.

Referring to the devices for operating the admission-valves 1 and 3, attention is directed to Figs. 1, 3, and 6 of the drawings, where 6 designates a lever lying parallel with the cylinder and movable on a fulcrum 7 by the governor 8, to the sleeve of which an end of said lever is attached. The outer portion of this lever 6 is forked and fits in a circumferential groove in a sleeve $8^a$, that is adapted to slide on a shaft 9 under the action of the governor upon said lever. The shaft 9 is rigidly mounted on the upper part of the cylinder and forms a guide to direct the sleeve. The sleeve $8^a$ has rigidly attached to its inner end a tappet-spring 10, that is likewise subjected to the same movement as the sleeve.

11 is a tappet on the outer or free end of the spring 10, which is adapted to be shifted in and out of a position above a serrated tip 12 on the end of the valve-stem $3^a$, and below the cam D. As shown in Fig. 3, the lower surface of the tappet 11 tapers to vary the openings of the admission-valves, and said surface may also be serrated to lock the governor against any vibration due to an excess of strain on the governor weights or springs. As is shown in the modified forms of tappet, Figs. 9 and 10, said tappet has a straight lower surface, and the tip 12 on the end of the valve-stem $3^a$ has a knife-edge. These constructions are available to effect a "hit and miss" of the valve-stem or vary the number of explosions. Either form of tappet may be used in connection with the shifting devices.

As before stated, the check-valve 5 admits the mixture from the intermediate chamber 4 to the combustion-chamber $2^a$, and it also prevents the force of the explosion affecting valve 3. The said valve 5 is opened by the cam D′, which is set in line with the cam D.

In order to illustrate a complete gas-engine, I have shown in the drawings a construction for controlling the contact and effecting a quick separation of the electrodes, and I will now proceed to describe the same, although it will be understood that the subject-matter relating to the electrode construction forms no part of my present application.

13 designates a stationary electrode projecting vertically into the combustion-chamber $2^a$. This electrode is inclosed in a bushing 14, which has an annular flange 15. 16 is a casing or plug screwed into an opening below said chamber, said plug also forming the means of approach to the check-valve. The bushing 14 projects through this casing and is somewhat smaller than the opening in order to provide surrounding space. Above and below the flange 15 there are insulating-rings 17, which are tightened by means of an adjusting-cap 18, that incloses the inner end of the casing and is adapted to be screwed thereon to secure the electrode in a proper position. The movable electrode consists of two parts 19 and $19^a$, the latter tapping into the former, as shown in Fig. 11.

20 is a sleeve fitting in an opening in the case. The inner end of said sleeve abuts with the inner member of the electrode and incloses the outer member. A nut $20^a$ tightens the parts. By thus constructing and mounting said electrode it may be easily removed by detaching the parts. The employment of a plug, in which it is customary to mount said electrode, is therefore dispensed with, and the water-jacket $20^b$ may be brought nearer to the electrode, as shown in Fig. 11. A curved spring 21 is rigid on the outer end of said sleeve 20, through which the lower end of an igniter-rod 22 loosely projects, as shown in Fig. 4. This igniter-rod stands vertically below the cam D″, and its lower end loosely penetrates both sides of the spring. 23 is a head or enlargement on the lower end of said igniter-rod below the spring, and 24 and 25 are similar devices on said rod that inclose the upper side of said spring and by means of which downward pressure is conveyed to said spring by said rod.

26 is a coil-spring around the upper portion of the igniter-rod. It is essential that this latter spring be substantially stronger than the curved spring 21, owing to the important part it performs in effecting a quick separation of the electrodes, as follows: As the cam D″ depresses the igniter-rod, which may occur on the outward stroke or partial compression-stroke of the piston, the spring 21 is moved sufficiently by said rod to move the electrode 19 in contact with the stationary electrode. When this contact is made, the igniter-rod continues to move downwardly, moving the head 23 away from the lower side of spring. As the cam D″ passes over said igniter-rod the rapid expansion of the spring 26 brings said head 23 again in contact with said spring and causes an instantaneous separation of the electrodes. At this moment the spark is created that causes the explosion in chamber $2^a$. The flame produced by this explosion passes in a substantial body through a passage $5^a$ to the cylinder (see Fig. 5) and there produces a thorough ignition of the mixture.

$5^b$ designates an inwardly-opening valve controlling the exhaust-passage 27, as shown in Fig. 3. This valve is operated by the cam $D^3$ through a lever 28, that has a fulcrum on a standard 29, that projects upwardly from the exhaust-casing. The stem $5^c$ of the exhaust-valve moves in an opening in a projecting portion of said standard. This construction is shown in Fig. 4, where it will be seen one end of the lever 28 rests upon the valve-stem and the other end has mounted thereon an antifriction-roller $28^a$, upon which the rotating cam $D^3$ operates.

I now refer to the gasolene attachment shown in Figs. 2, 7, and 8, which consists of an oil-reservoir 30, mounted above the valve-box H. This reservoir has an oil-opening 31, that communicates with chamber 4, adjacent to valve 5, and the feed of oil therethrough is controlled by the valve mechanism, consisting of an outer or timing valve 32, which controls the feed to an inner needle-valve 33, which regulates the quanity. The outer or timing valve 32 is under the control of the governor through means of a forked lever 34, which is fulcrumed at 35 and is movable by the valve-stem $3^a$ of valve 3. In the application of this gasolene attachment the gas is shut off from the valve 1, and the function of valve 3 is to admit air to the chamber 4. The inner or measuring valve 33 is stationary— that is to say, when set at a proper position or adjusted by screwing it in or out of its seat it so remains and is not affected by the governor or outer valve 32. The quantity of mixture or air that passes through valve 3 depends entirely upon the action of the governor in shifting the tappet 11, and the supply of air and gas bear a uniform relation whether in large or small quantities of mixture. Thus there is a uniformity in the quality of the mixture, the only variation being in the quantity of said mixture admitted to the cylinder. The check-valve 5 remains open during the full length of the outward stroke of the piston. It will be understood that when the form of the tappet 11 shown in Figs. 2 and 3 is used the admission of mixture to the power-cylinder is regular, though varying in quantity, while with the form of the tappet shown in Figs. 9 and 10 the admission takes place whenever the speed of the engine becomes normal.

Having fully described my invention, I claim as new and desire to secure by Letters Patent—

1. In a gas-engine, the combination with a mixture-admission valve opening into a mixing-chamber, a gas-admission valve opening outwardly from said chamber, and a check-valve opening into a combustion-chamber, and controlling the passage from the mixture-admission valve to the combustion-chamber, of a tapering tappet, a yielding support upon which said tappet is mounted, a governor to shift said tappet and support, and means for guiding the movement of said support, whereby the said admission-valves may be subjected to variable and simultaneous openings to admit mixture to the combustion-chamber, substantially as shown and described.

2. In a gas-engine, the combination with a gas-admission valve opening into a mixing-chamber, a mixture-admission valve opening outwardly, and a check-valve opening into a combustion-chamber, of a lever operated by the governor, a sleeve movable by said lever, a tappet-spring carried by said sleeve, and a tapering tappet carried by said spring adapted to vary the openings of said admission-valves, and cams for depressing said tappet and check-valve.

3. In a gas-engine, the combination with a governor and a lever operated and controlled by said governor, of a sleeve connected with said lever and controlled thereby and having a curved spring thereon, a tappet on said spring, a valve and its stem operated by said tappet, and means for depressing said tappet to operate said valve and stem, substantially as shown and described.

4. In a gas-engine, the combination with a governor, a lever engaged at one end to said governor, and the other end of said lever engaging a sliding sleeve, of a curved spring carried by said sleeve having a tappet on its free end, and means for depressing said tappet, and a valve-stem adapted to be struck by said tappet, substantially as shown and described.

5. In a gas-engine, the combination with a lever operated by the governor, and a rotating cam-shaft, of a gasolene-valve consisting of an inner measuring-valve and an outer timing-valve, and an admission-valve to the stem of which said gasolene-valve is connected, a curved spring actuated by said lever, and a tappet on the free end of said spring adapted to strike the stem of said admission-valve and thereby effect an opening of the gasolene-valve and said admission-valve, and a cam to depress said tappet, substantially as and for the purposes specified.

6. In a gas-engine, the combination with an admission-valve, opening into a chamber adapted to receive air, and a check-valve opening into a combustion-chamber, of a gasolene-orifice opening into a chamber between said valves and adjacent to said check-valve, a needle-valve to measure the feed of oil to said chamber, and a timing-valve operated from the stem of said admission-valve and adapted to time or regulate the feed of oil to said needle-valve, and means operated by the governor and cam-shaft for operating said admission-valve, substantially as and for the purposes specified.

7. In a gas-engine, a gasolene-valve consisting of an inner measuring-valve, and an outer timing-valve controlling the feed to said inner valve, and means interposed between the timing-valve and the driving mechanism for opening said timing-valve.

In testimony whereof I affix my signature in presence of two witnesses.

HARRY G. CARNELL.

Witnesses:
WM. G. FRIZELL,
BLANCHE M. TURNER.